Feb. 25, 1969  P. STOLZER  3,429,213
SAWING MACHINE
Filed Oct. 14, 1966  Sheet 1 of 2
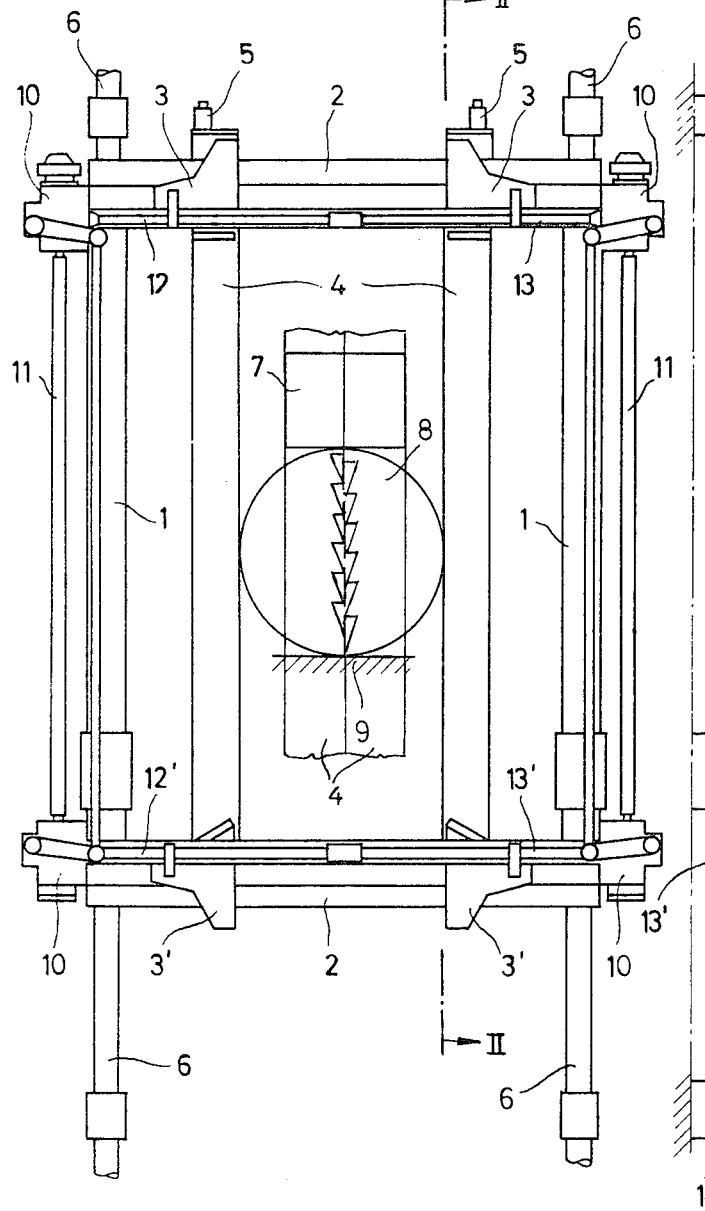
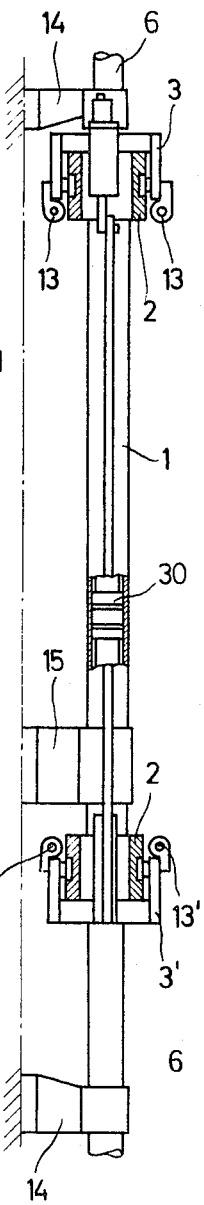
INVENTOR.
PAUL STOLZER
BY Bailey, Stephens & Huettig
ATTORNEYS Feb. 25, 1969 P. STOLZER 3,429,213
SAWING MACHINE
Filed Oct. 14, 1966
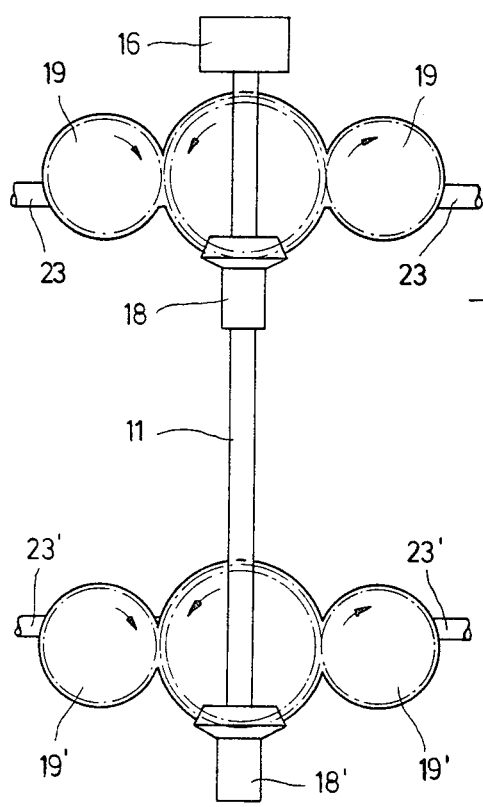
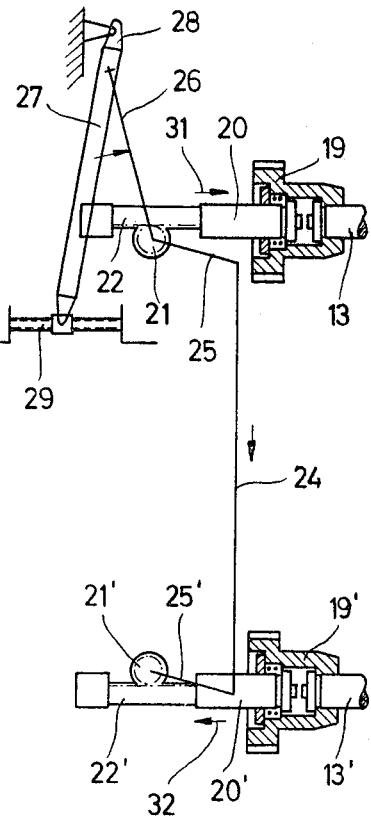
INVENTOR.
PAUL STOLZER

United States Patent Office 3,429,213
Patented Feb. 25, 1969

3,429,213
SAWING MACHINE
Paul Stolzer, Achern, Baden, Germany, assignor to Keuro Maschinenbau G.m.b.H. & Co. K.G., Baden, Germany
Filed Oct. 14, 1966, Ser. No. 586,749
Claims priority, application Germany, Oct. 14, 1965,
K 57,391
U.S. Cl. 83—647                         9 Claims
Int. Cl. B26d 5/08

ABSTRACT OF THE DISCLOSURE

A sawing machine has a frame formed of vertical transverse members with an arrangement for moving the frame up and down. Blocks slidably mounted on the transverse members have saw blades stretched between them. Threaded spindles carried by the transverse members engaging in nuts connected to the blocks produce horizontal movement of the blades. The spindles are reversed on the return stroke so that the blades move out of sawing engagement with the workpiece. The direction of cutting strokes of the saw blades can be changed from a straight to an arcuate direction.

---

The present invention relates to a sawing machine which is especially suitable for crosscutting workpieces of large cross-sectional dimensions.

Such crosscutting operations are usually carried out by gas cutting or by sawing. Gas cutting has the disadvantage that it may be employed only when the unavoidable structural changes which then occur in the workpieces adjacent to the cuts will not affect their future use, for example, when cutting up scrap metal or ordinary structural steel which does not contain any particular alloys. Workpieces of more highly alloyed materials, however can only be cut by sawing which may be done by different machines, such as power hacksaws, bandsaws, or circular saws, all of which have certain disadvantages.

In a hacksaw the saw blade is clamped in a solid bow and then cuts by reciprocating movements downwardly through the workpiece. The required cutting pressure is produced by a weight which may be varied by being shifted to different distances from the bearing of the saw or by exerting a hydraulically controlled pressure upon the saw bow. Such hacksaws are, however, very unsuitable for cutting workpieces of large cross-sectional dimensions since the cutting pressure of the saw upon the workpiece varies considerably during the sawing operation as it is higher near the bearing of the saw than at the opposite end of the workpiece. Furthermore, the construction of such a large power hacksaw is very expensive especially because of the considerable moments occurring in the saw bow and the large stresses which are exerted upon the bearings and the frame of the machine.

Bandsaws can only be employed for cutting workpieces of smaller cross-sectional sizes since it is very difficult to control the unguided length of the saw blade which is required for cutting apart large workpieces.

Circular saws finally have the disadvantage that the cross-sectional size of the workpiece to be cut depends upon the manner of securing the circular saw blade, its diameter, and the manner of driving it. Even under favorable conditions it is only possible to cut through a workpiece of a cross-sectional size which is smaller than the radius of the saw blade by the radius of the hub carrying the blade. Although theoretically it would be possible to turn a workpiece about its axis after cutting it for a certain distance from one side and to sever it completely by two or three cuts within the same plane, such an operation would result in a very unclean cut.

Furthermore, in actual practice it is very difficult or even impossible to turn the workpieces as required. For cutting apart workpieces of large cross-sectional dimensions by means of a circular saw, it is therefore necessary to employ a very large machine which has a saw blade of a diameter of several meters and a thickness of 20 to 30 mm. The low cutting output of such a machine and the high power which is required for driving it are entirely out of proportion to the effect which is to be attained. An additional reason why such circular saws are very rarely employed is the large space which is required by them.

It is therefore an object of the present invention to provide a sawing machine which is especially adapted for crosscutting workpieces of large cross-sectional dimensions and is designed so as to overcome the disadvantages of the various machines which were previously employed for this purpose, and which therefore has small outer dimensions, may be built at a low cost, and has a power consumption which at the most is as high as that of a large power hack saw of a normal type.

According to the invention, this object is attained by means of a sawing machine which is provided with two hacksaw blades which are disposed within the same plane and are adapted to cut into the workpiece from two opposite sides thereof, and which for this purpose are both reciprocated within this common plane and moved toward and under a suitable pressure against the intermediate workpiece during their strokes in one direction so as to cut the workpiece simultaneously from opposite sides, while during their strokes in the opposite direction they are moved away from each other so as to disengage from the workpiece and thus carry out their idle return strokes.

Some of the inventive features of the new sawing machine consist in the provision of a rigid, substantially rectangular frame which is preferably disposed within a vertical plane and adapted to be reciprocated in a vertical direction, in providing suitable means for clamping the workpiece to be cut in a fixed position so as to extend at a suitable angle to the plane of the frame transversely through the inside thereof, in mounting two hacksaw blades on the frame so as normally to extend substantially in the direction of the reciprocating movement of the frame at both sides of the workpiece and in a position so that the cutting edges of both saw blades face each other and thus toward the workpiece and the flat sides of both blades are disposed within the same plane parallel to the plane of the frame and its reciprocating movement, and in providing suitable means for moving the two saw blades independently of each other toward and under a suitable pressure against the opposite sides of the workpiece during the cutting strokes of the frame and saw blades and for also moving the saw blades away from each other and out of engagement with the workpiece during the idle return strokes of the frame and saw blades.

For properly guiding and moving the saw blades toward and away from each other during the cutting and return strokes, it is another feature of the invention to provide at least one pair of slide carriages for each saw blade which are slidable on two opposite frame members extending at substantially right angles to the direction of the reciprocating movement of the frame and between which the respective saw blade is clamped under the required tension, and to provide driving means for moving the slide carriages for each saw blade toward and under the required pressure against the workpiece during the cutting strokes and for moving them out of engagement with the workpiece during the return strokes. Another feature of the invention consists in the provision of separate driving means for the slide carriages of each saw blade so as to permit each saw blade to move toward and away from the workpiece independently of the other saw blade and to exert a uniform cutting pressure upon one side of the workpiece independently of the cutting pressure which is exerted by the other blade upon the other side of the workpiece. This independent movement of each saw blade is particularly of importance when cutting workpieces of different hardness or different cross-sectional sizes at both sides thereof. Each saw blade may thus carry out its cutting strokes upon its side of the workpiece with the most suitable uniform cutting pressure in accordance with the cross-sectional size and other properties of this side of the workpiece. In addition, the new sawing machine permits the saw blades to be very easily and quickly exchanged in accordance with the particular material to be cut and also a different kind of saw blade to be mounted on each pair of slide carriages at the opposite sides of the workpiece. The application of either of these two last-mentioned features or of a combination of both features results in a considerable reduction of the power consumption of the machine and permits the same to be built of small dimensions, of a relatively simple construction and at a low cost.

Another feature of the invention consists in the provision of suitable adjusting means for varying the movements of the slide carriages of each saw blade relative to each other so as to permit the saw blade either to carry out straight cutting strokes or arcuate cutting strokes which may also be adjusted so as to have different degrees of curvature. This may be effected, for example, by mounting the slide carriages of each saw blade so as to be movable relative to each other in the axial direction on their respective frame members and independently of their movement by their driving means by means of a rack and pinion and a lever which is connected at one end to the pinion and radially projects therefrom and carries on its other a sliding block or the like which is slidable during the upward and downward strokes of the frame within a guide rail which is pivotably mounted at one end in a fixed position and is adjustable to different inclinations at its other end. If the guide rail of this mechanism is adjusted so as to extend parallel to the direction of the reciprocating movements of the frame, the saw blade will carry out straight cutting strokes and if it is adjusted so as to be inclined to the direction of the movements of the frame, the saw blade will carry out more or less arcuate cutting strokes.

Another feature of the invention consists in providing a common guide rail and sliding block for each pair of slide carriages for one saw blade, in interconnecting the levers on the pinions which are associated with the means for shifting each pair of slide carriages by a suitable coupling element and in designing this coupling element or in mounting the pinions in a manner so as to permit the shifting means for each pair of slide carriages to be movable in opposite axial directions. This feature of the invention has the advantage that all of the teeth of each saw blade will cut a workpiece with nearly the same constant cutting pressure. This cutting pressure is independent of the cross-sectional dimensions of the workpiece since due to the arcuate cutting direction only a few teeth of each saw blade will ever be in cutting engagement with the workpiece. Consequently, the saw blades will always exert the best possible cutting action upon the workpiece.

If the shifting means for the slide carriages are provided in the form of threaded spindles, the spindles of each pair of slide carriages may be connected to each other by means of a longitudinal shaft and bevel gear units and may together be acted upon during each cutting stroke of the frame by an adjustable torque which is produced by the drive mechanism and acts in the direction toward the workpiece, while when the movement of the frame is reversed for each idle stroke, the spindles are turned by the drive mechanism for an adjustable distance in the opposite direction. This prevents the saw blades during the idle strokes from engaging with the material and from thus being worn off. This feature of the invention is especially important and necessary especially when the cutting strokes are carried out in arcuate directions. Also, since during the cutting strokes all of the spindles are affected by an adjustable torque which acts in the direction toward the workpiece, a constant cutting pressure along the entire cutting distance will always be attained which may be adjusted in accordance with the type of material to be cut and the kind of saw blade to be used. The further advantage which will thus be attained is that workpieces of an irregular cross section will be cut with a uniform cutting pressure not only at the side of a larger cross-sectional size but also at the side of a smaller size, and that such workpieces will therefore be severed at both sides under the best possible cutting conditions. Of course, in place of threaded spindles it is also possible to employ other suitable driving means such as chains, racks, or the like for the means for shifting the slide carriages.

For attaining the mentioned requirements in a very simple manner it is another feature of the invention to provide the driving means for each pair of slide carriages carrying one saw blade in the form of a hydraulic motor the torque of which may be controlled in a conventional manner by means of an adjustable pressure relief valve which is inserted between the hydraulic-pressure supply pump and the controlling valve, further to supply the hydraulic motor continuously with a pressure which has the tendency to move the saw blades away from each other, and to control the pressure during the idle strokes of each saw blade by means of a relief valve which according to the invention may be time-controlled so as to be opened for a particular length of time during which the pressure acting in the cutting direction will be reduced to the desired value and the hydraulic motor will then be turned for the desired extent in the opposite direction by the pressure which causes the saw blades to move away from each other. The same result may, however, also be attained by employing electric driving means, for example, synchro-ties or the like, which comply with the same conditions as the hydraulic drive mechanism.

For attaining a uniform cutting pressure of each saw blade independently of the type of material and the cross-sectional shape and dimensions of the workpiece to be cut, it is advisable to provide between the two drive mechanisms a device of a conventional type which equalizes the torque of the drive mechanisms and is adapted to be engaged and disengaged. When employing hydraulic motors, this device may in the most simple case consist of a connection between the hydraulic supply lines and the motors, but if the drive mechanisms are of a mechanical type this device may consist of a differential gear or similar means.

For preventing the saw blades from being damaged when they are moved completely against each other, it is advisable to offset them to such an extent in the longitudinal direction relative to each other that the tips of the teeth of one saw blade will then engage into the tooth gaps of the other blade. The workpieces may in this manner be completely severed and will have a clean cut.

The above-mentioned as well as additional features and advantages of the present invention will become more clearly apparent from the following detailed description thereof which is to be read with reference to the accompanying diagrammatic drawings, in which—

FIGURE 1 shows a side view of the sawing machine according to the invention;

FIGURE 2 shows a cross section which is taken along the line II—II of FIGURE 1;

FIGURE 3 shows a side view of the drive mechanism including the gear unit for the sawing machine according to FIGURES 1 and 2; while FIGURE 4 shows, partly in section, a side view of a part of the gear unit, as seen at a right angle to FIGURE 3.

As illustrated particularly in FIGURES 1 and 2 of the drawings, the sawing machine according to the invention comprises a rigid frame which is composed of a pair of hydraulic cylinders 1, which may extend, for example, in a vertical direction, and crossbars 2 which connect these cylinders to each other, and two pairs of slide carriages 3 and 3' which are movable horizontally along the crossbars 2 and carry a pair of straight saw blades 4 which are adapted to be tightened by suitable means 5. Each cylinder 1 contains a tubular piston rod 6 through which the hydraulic fluid may be conducted into the cylinder chamber for reciprocating the frame 1, 2 at any desired speed, for example, in the vertical direction. For reversing its direction of movement, frame 1, 2 is adapted to engage upon electric limit switches, not shown, which act upon associated magnetic valves. The position of the limit switch or switches which control the reversal of the movement of the frame is adjustable in accordance with the position of the work-clamping jaw 7, i.e., with the thickness of the workpiece 8, so as to permit the length of the strokes to be varied in accordance with the cross-sectional size of the particular workpiece to be cut. At the outer side of each hydraulic cylinder 1, a pair of gear units 10 are provided which are connected at one side to each other by a shaft 11 and at the other side to spindles 12 and 13 or 12' and 13', respectively, which serve for shifting the slide carriages 3 and 3' along the crossbars 2 in a direction transverse to the direction of movement of frame 1, 2. Frame 1, 2 is connected to the machine frame by means of the cylinders 1, piston rods 6, brackets 14, and bearings 15 so as to be movable, for example, in opposite vertical directions.

The function of the gear units 10 is illustrated particularly in FIGURES 3 and 4. Each pair of slide carriages 3 and 3' is associated with a hydraulic motor 16 which by means of a shaft 17 and bevel gears 18 and 18' drives the spur gears 19 and 19' which are rigidly secured to the spindles 12, 13 and 12', 13', respectively. Depending upon the direction of rotation of the hydraulic motor 16, slide carriages 3 and 3' are then moved either toward or away from the workpiece. Each spur gear 19 and 19' is rotatably mounted on a short shaft 20 or 20' which is movable in its axial direction by a pinion 21 or 21' which is in mesh with a rack 22 or 22' on shaft 20 or 20', respectively. Pinions 21 and 21' which are mounted in fixed positions within each gear unit on shafts 23 and 23', respectively, are also positively connected to each other by a crank or link connection 24 and the levers 25 and 25' on pinions 21 and 21'. Pinion 21 is in addition rigidly connected to a lever 26, the outer end of which carries a sliding block 26', which is slidable within a guide rail 27. This guide rail 27 is pivotally connected at its upper end at 28 to the machine frame, while its lower end is pivotably connected to a nut which may be screwed to different positions on a spindle 29 for varying the inclination of guide rail 27.

For cutting apart a workpiece 8, the two saw blades 4 are moved by the hydraulic motors 16 and the gear units 10 toward and against the workpiece under the pressure which is supplied through the hydraulic lines. The saw blades may be moved entirely independently of each other against the workpiece 8 so that both saw blades may be moved under different cutting pressures against the workpiece if the hydraulic supply lines of both motors 16 are independent of each other. If these supply lines are shunted to each other, both motors 16 will be acted upon by the same pressure. Consequently, the two saw blades will also act upon the workpiece with the same cutting pressure. If, however, such a shunt connection is interrupted, the cutting pressure of each saw blade may be independently adjusted by an adjustment of the respective relief valve, for example, for the purpose of cutting a workpiece which has a different cross section on both sides thereof. The upward and downward movements of frame 1, 2 are effected by a reversible hydraulic pump which alternately supplies the cylinder chambers above and underneath the pistons 30 with oil under pressure and may also be controlled so as to move the frame at a different speed during the cutting strokes of the saw blades than during their idle strokes. During the upward and downward movements of the frame the sliding block on lever 26 will slide along the guide rail 27 and thereby force the pinions 21 and 21' to carry out reciprocating rotary movements. Since pinion 21 acts upon the rack 22 on the lower side of shaft 20 and pinion 21' acts upon rack 22' on the upper side of shaft 20', spindle 13 will be shifted in the direction of the arrow 31, while spindle 13' will be shifted in the opposite direction as shown by the arrow 32. The slide carriages 3 and 3' will therefore be moved in opposite directions resulting in arcuate cutting strokes of each saw blade. The degree of curvature of these arcuate cutting strokes may be varied by an adjustment of the inclination of guide rail 27 by means of the spindle 29. Thus, not only the cutting pressure of saw blades 4 but also their cutting direction may be adjusted so as to be the most effective in accordance with the type of material and the cross-sectional shape and dimensions of the workpieces.

FIGURE 1 shows the offsetting of the saw blades relative to each other so that the tips of the teeth of one saw blade engage the tooth gaps of the other saw blade.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A sawing machine for crosscutting of workpieces comprising a rigid substantially rectangular frame having opposite longitudinal frame members and opposite transverse frame members, means for clamping a workpiece in a fixed position at the inside and independently of said frame, a pair of slide carriages slidably mounted on each of said transverse frame members, means for connecting a pair of saw blades within the same plane to the corresponding slide carriages on both transverse frame members at both sides of said clamping means so that the teeth of said saw blades face each other, means for tightening said saw blades between said corresponding slide carriages, means for reciprocating said frame together with said slide carriages and said saw blades relative to said workpiece in the direction of said longitudinal members for carrying out cutting strokes in one direction and idle strokes in the opposite direction, and means carried by said frame for shifting said slide carriages for each saw blade along said transverse members in the opposite direction to the shifting movement of the slide carriages for the other saw blade along said transverse members so as to move said saw blades within the same plane toward said workpiece during the cutting strokes and away from each other during the idle strokes of said saw blades, said shifting means comprising at least two pairs of threaded spindles, the spindles of each pair being operatively associated with one of said blades and extending substantially parallel to said transverse members.

2. A sawing machine as defined in claim 1, further comprising means for controlling said shifting means so as to vary the cutting pressure of said saw blades in accordance with the properties of the workpiece.

3. A sawing machine as defined in claim 1, in which said shifting means are adapted to shift said slide carriages for each saw blade independently of the slide carriages for the other saw blade.

4. A sawing machine as defined in claim 1, in which said shifting means comprise at least two pairs of threaded spindles, said spindles of each pair being operatively associated with one of said blades and extending substantially parallel to said transverse members, nut means on and movable along said spindles when rotated and secured to said slide carriages for each saw blade, means for rotatably mounting said spindles for each saw blade independently of the spindles for the other saw blade, means for connecting the spindles of each pair to each other so as to be rotatable simultaneously in the same direction, separate driving means for each pair of said spindles, and means for reversing the direction of rotation of each pair of spindles at the end of each stroke of said frame and said saw blades thereon.

5. A sawing machine as defined in claim 1, further comprising additional shifting means for moving said first shifting means for the slide carriages on one of said transverse members at least during the cutting strokes along said one transverse member relative to the first shifting means for the slide carriages on the other transverse member so as to vary the direction at least of said cutting strokes of each saw blade from a straight direction to an arcuate direction.

6. A sawing machine as defined in claim 5, in which said additional shifting means comprise means for mounting each of said spindles so as to be movable in its axial directions independently of its rotation by said first shifting means, a rack connected to each spindle, a pinion in mesh with said rack, a lever secured at one end to and radially projecting from at least one of said pinions, a guide rail pivotally mounted at the one end in a fixed position, a sliding block on the other end of said lever and slidable during the reciprocating movements of said frame along said guide rail, and means connected to the other end of said guide rail for varying the inclination of said guide rail and for thereby varying the direction of said cutting strokes of one of said blades from a straight direction to an arcuate direction.

7. A sawing machine as defined in claim 6, in which only one of said pinions which are associated with said pair of spindles for the slide carriages of one saw blade carries said lever and said sliding block thereon which is slidable along said guide rail, and further comprising means for connecting said two pinions to each other for turning said pinions simultaneously in opposite directions and for thereby shifting said spindles for said pair of slide carriages in opposite axial directions.

8. A sawing machine as defined in claim 4, in which said separate driving means for each of said spindles comprise hydraulic motors.

9. A sawing machine as defined in claim 1, in which said saw blades are offset in their longitudinal direction relative to each other to such an extent that, when the saw blades are moved fully toward each other, the tips of the teeth of one saw blade engage into the tooth gaps of the other saw blade.

References Cited

UNITED STATES PATENTS

| | | | |
|---|---|---|---|
| 2,404,707 | 7/1946 | Hasegawa | 83—647 X |
| 2,412,311 | 12/1946 | Ziska | 83—647 X |

ANDREW R. JUHASZ, *Primary Examiner.*